United States Patent

Kudoh

Patent Number: 5,243,663
Date of Patent: Sep. 7, 1993

[54] VEHICLE DETECTING METHOD AND APPARATUS PERFORMING BINARY-CONVERSION PROCESSING AND LUMINANCE VARIATION PROCESSING

[75] Inventor: Katsuhiro Kudoh, Kawasaki, Japan

[73] Assignee: Matsushita Electric Industrial Co., Ltd., Osaka, Japan

[21] Appl. No.: 770,470

[22] Filed: Oct. 3, 1991

[30] Foreign Application Priority Data

Oct. 11, 1990 [JP] Japan .................... 2-270371

[51] Int. Cl.$^5$ .............................. G06K 9/00
[52] U.S. Cl. ........................ 382/1; 382/48; 358/108; 340/932.2; 340/937
[58] Field of Search ............ 382/1, 18, 48, 51; 358/107, 108, 109; 340/932.2, 933, 937

[56] References Cited

U.S. PATENT DOCUMENTS

| | | | |
|---|---|---|---|
| 4,160,998 | 7/1979 | Kamin | 358/105 |
| 4,845,761 | 7/1989 | Cate et al. | 382/1 |
| 4,947,353 | 8/1990 | Quinlan, Jr. | 364/562 |

FOREIGN PATENT DOCUMENTS

| | | | |
|---|---|---|---|
| 3-71399 | 3/1991 | Japan | 340/937 |
| 3-194699 | 8/1991 | Japan | 340/937 |

Primary Examiner—David K. Moore
Assistant Examiner—Andrew W. Johns
Attorney, Agent, or Firm—Stevens, Davis, Miller & Mosher

[57] ABSTRACT

A vehicle detecting apparatus for detecting a vehicle in each vehicle existence judging region based on binary pixel data, wherein a luminance level at which a variance of luminance of pixels in each vehicle existence judging region takes a maximum value is calculated to thereby perform a vehicle detection by utilizing a change appearing in the variance of luminance in the vehicle existence judging region, where the change is caused by a quite small number of pixels in the vehicle existence judging region having luminance levels lower than a lower threshold value or higher than an upper threshold value, even if the majority of the pixels in the vehicle existence judging region have a luminance close to that of a road surface.

2 Claims, 3 Drawing Sheets

VEHICLE DETECTING METHOD AND APPARATUS PERFORMING BINARY-CONVERSION PROCESSING AND LUMINANCE VARIATION PROCESSING

BACKGROUND OF THE INVENTION

1. Field of the Invention

This invention relates to a vehicle detecting apparatus for judging crowdedness in a parking lot from the state of vehicles being parked therein.

2. Prior Art

A conventional vehicle detecting apparatus, as shown in FIG. 1, is composed of a television camera 61, an A/D converter 62 for converting an output from the television camera to a digital signal, a multiple value image memory 63 for storing image information converted by the A/D converter 62, a road surface luminance detector 65 for detecting luminance of a part of the information corresponding to a road surface stored in the multiple-value image memory 62, a vehicle existence judging region setting unit 64 for setting a region along the border of a parking space for parking a vehicle in which the presence or the absence of a vehicle is judged and extracting stored information corresponding to the set region, a binary converting circuit 66 for converting multiple-value information stored in the memory 63 to binary data, a vehicle existence judging threshold value setting unit 67 for setting a threshold value for judging the existence of a vehicle, and a vehicle detector 68 for detecting a vehicle based on the threshold values.

The operation of the conventional vehicle detecting apparatus as shown in FIG. 1 will be next described.

An image signal including a parked vehicle picked up by the television camera 61, after being converted to a digital signal by the A/D converter 62, is stored in the multiple-value image memory 63.

In the road surface luminance detector 65, a single region only including a road surface such as a passageway for vehicles or the like is selected, a variance of luminance data in that region is calculated, and a maximum value a of the variance and a luminance level b at that time are detected and outputted to the binary converting circuit 66. In the binary converting circuit 66, $b+\sqrt{a}$ and $b-\sqrt{a}$ are calculated as threshold values for binary conversion. If multiple-value data is larger than $b+\sqrt{a}$ or smaller than $b-\sqrt{a}$, "1" is outputted, and otherwise "0" is outputted. The output is applied to the vehicle detector 68.

In the vehicle detector 68, the number of pixels set at "1" in the vehicle existence judging region preset by the vehicle existence judging region setting unit 64 is counted, and then it is examined whether or not the counted value exceeds the threshold value for vehicle existence judgment which has been set in the vehicle existence judgement threshold value setting unit 67, to output the presence or the absence of a vehicle within a parking space.

The conventional vehicle detecting apparatus as mentioned above is capable of detecting a vehicle having luminance lower than that of the road surface by setting the two threshold values having a range therebetween and setting a binary "1" to a pixel having luminance higher than the maximum value of the range, that is, the upper threshold value, or lower than the minimum value of the range, that is, the lower threshold value.

Since such a conventional vehicle detecting apparatus sets two threshold values for binary conversion with a range from $b+\sqrt{a}$ to $b-\sqrt{a}$, a pixel having luminance within this range of the threshold values for binary conversion will not be extracted as characteristic. Stated another way, a vehicle, even if being parked in a parking space, will not be detected by the conventional vehicle detecting apparatus if the number of pixels having luminance within the two threshold values for binary conversion is larger than the number of pixels having luminance out of the two threshold values.

SUMMARY OF THE INVENTION

The present invention solves the above-mentioned problem inherent to the conventional vehicle detecting apparatus, and its object is to provide a vehicle detecting apparatus which is capable of accurately detecting a vehicle which is being parked in a parking space.

To achieve the above object, the present invention is adapted to derive a luminance level at which a variance of luminance of pixels in each vehicle existence judging region takes the maximum value along with a vehicle detection in each vehicle existence judging region by binary pixel data, thereby preventing the vehicle detection using binary pixel data from failing in case most of the pixels in a vehicle existence judging region have a luminance close to that of a road surface.

According to the present invention, by calculating a variance of luminance of pixels in a vehicle existence judging region, even if the majority of pixels in a vehicle existence judging region have a luminance close to that of a road surface and accordingly a vehicle cannot be detected by the binary conversion processing due to a failure in extracting the characteristic of the vehicle, a very small number of pixels having a luminance level lower than or higher than the threshold values cause a change in variance in the vehicle existence judging region, thereby making it possible to detect a vehicle.

DESCRIPTION OF THE PREFERRED EMBODIMENT

Figure 1:
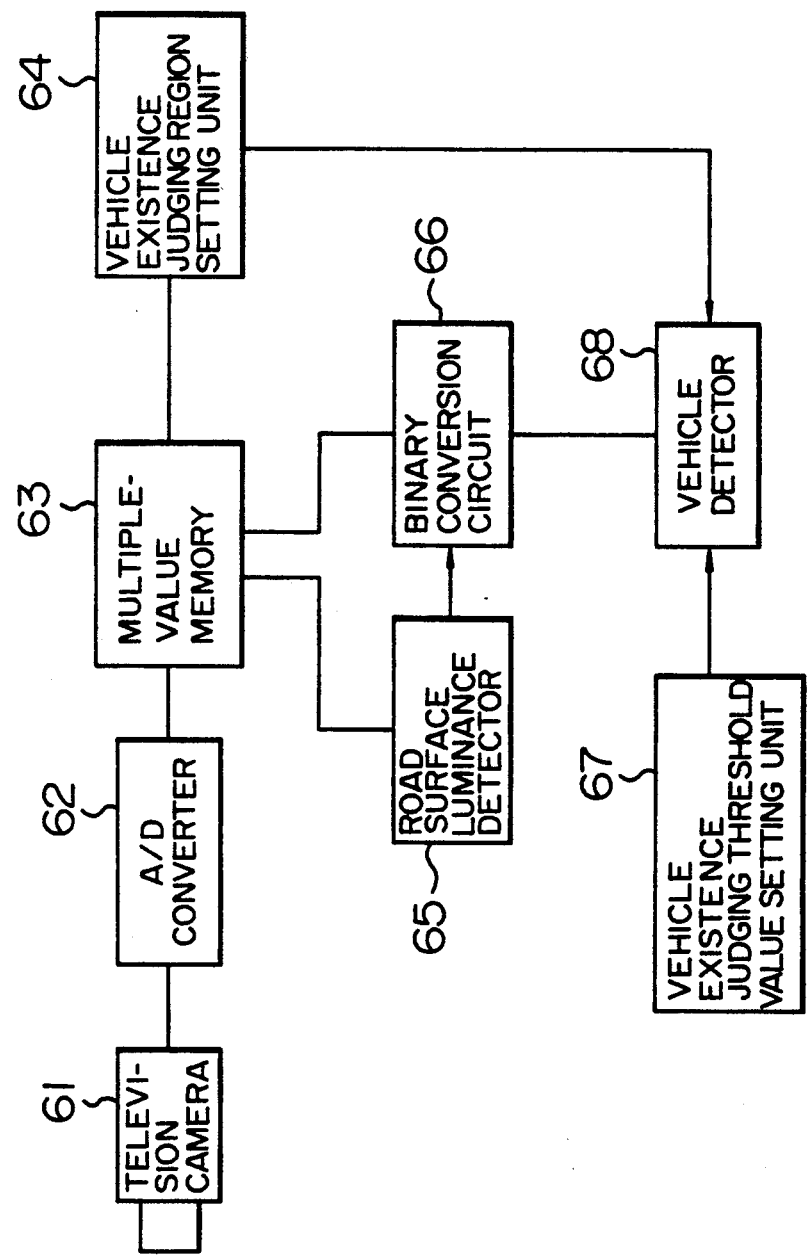
FIG. 1 is a block diagram illustrating the configuration of an example of a conventional vehicle detecting apparatus.
Figure 2:
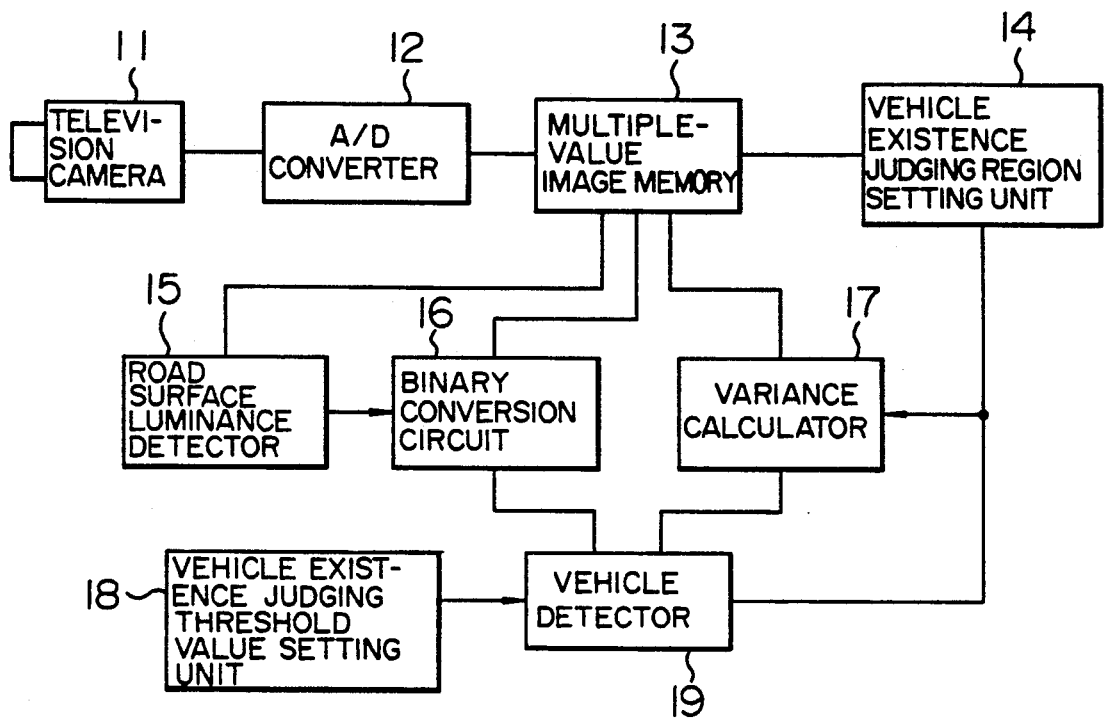
FIG. 2 is a block diagram illustrating the configuration of an embodiment of a vehicle detecting apparatus according to the invention.

A vehicle detecting apparatus of the present invention, as shown in FIG. 2, comprises a television camera 11, an A/D converter 12 for converting an output from the television camera 11 to a digital signal, a multiple-value memory 13 for storing the A/D converted image information, a vehicle existence judging region setting unit 14 for setting a region along the border of a parking space for judging the presence or the absence of a vehicle and extracting stored information corresponding to the region, a road surface luminance detector 15 for detecting luminance of a part of the stored information corresponding to a road surface, a binary converting circuit 16 for converting multiple-value information stored in the memory 13 to binary data based on an output from the road surface luminance detector 15, a variance calculator 17 for calculating a variance of pixel luminance data in the vehicle existence judging region, a vehicle existence judging threshold value setting unit 18, and a vehicle detector 19.

The operation of the vehicle detecting apparatus thus constructed will be next described.

An image signal including a vehicle being parked in a parking space picked up by the television camera 11, after being converted to a digital signal by the A/D converter 12, is stored in the multiple-value memory 13 at predetermined time intervals.

Figure 3:
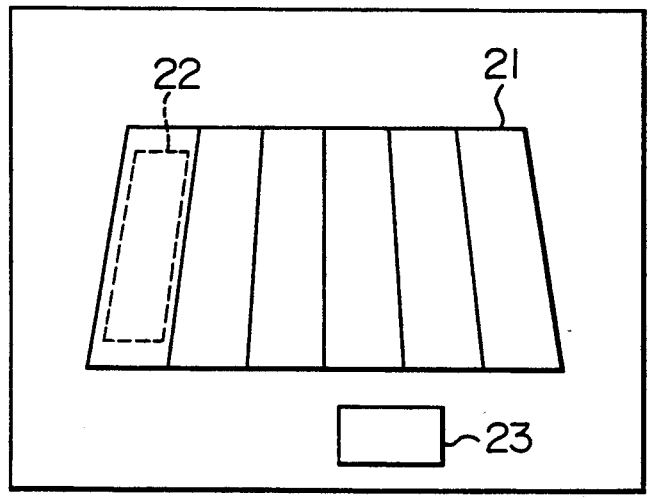
FIG. 3 is a diagram illustrating an example of a vehicle existence judging region in a parking space and a road luminance detecting region.

In the vehicle existence judging region setting unit 14, a vehicle existence judging region 21 has been preset along the broader of each parking space 22, as shown in FIG. 3.

The road surface luminance detector 15 selects from video data stored in the multiple-value video memory 13 a part corresponding to a region 23 which only includes a road surface such as a passage for vehicles, calculates a variance of luminance of the region 23, detects a maximum value a of the variance and a luminance level b at that time, and outputs the same to the binary converting circuit 16.

In the binary converting circuit 16, $b-\sqrt{a}$ and $b+\sqrt{a}$ are determined to be threshold values for converting the outputs a and b from the road surface luminance detector 15 to binary data. If a luminance level $\alpha$ of a pixel stored in the multiple-value video memory 13 satisfies the equation $\alpha < b-\sqrt{a}$ or $b+\sqrt{a} < \alpha$, "1d" is outputted. Otherwise, that is, $b-\sqrt{a} \leq \alpha \leq b+\sqrt{a}$ exists, an "0" is outputted.

The variance calculator 17 calculates a variance of the luminance within each parking space 22 in the vehicle existence judging region 21 set by the vehicle existence judging region setting unit 14 and a luminance level $\beta$ at which the variance takes a maximum value.

The vehicle detector 19 counts the number of 1's in the output from the binary converting circuit 16 at the previous stage for the region set by the vehicle existence judging region setting unit 14, and judges that a vehicle is present ("Vehicle Present") if the counted number of 1's exceeds the threshold value set in the vehicle existence judging threshold value setting unit 18. Otherwise, the vehicle detector 19 judges that no vehicle is present ("Vehicle Absent").

Simultaneously in the variance calculator 17, the luminance level $\beta$ at which the variance of each vehicle judgement region takes a maximum value is compared with the threshold values $b-\sqrt{a}$ and $b+\sqrt{a}$ for binary conversion. If the level $\beta$ satisfies $b-\sqrt{a} \leq \beta \leq b+\sqrt{a}$, "Vehicle Absent" is judged. If $\beta < b-\sqrt{a}$ or $b+\sqrt{a} < \beta$ stands, "Vehicle Present" is judged.

For a parking space to which "Vehicle Present" has been judged from the binary value result, the judgement "Vehicle Present" is outputted as it is. On the contrary, for a parking space to which "Vehicle Absent" has been judged from the binary value result, the result of the judgement made from the variance is considered. If "Vehicle Present" is resulted from the judgment based on the variance, "Vehicle Present" is outputted as the result. Otherwise, "Vehicle Absent" is outputted as the result.

Figure 4:
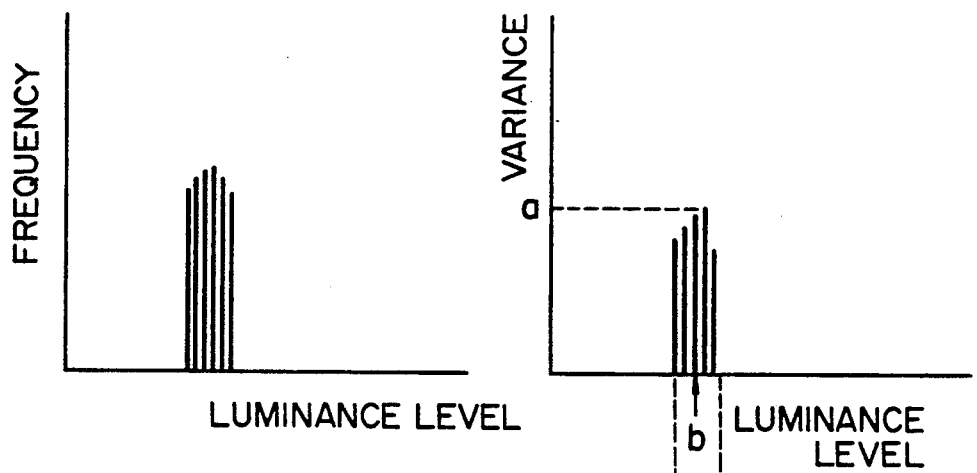
FIG. 4 contains graphs illustrating examples of a luminance distribution and a luminance variance of pixels in a region which includes only a road surface.
Figure 5:
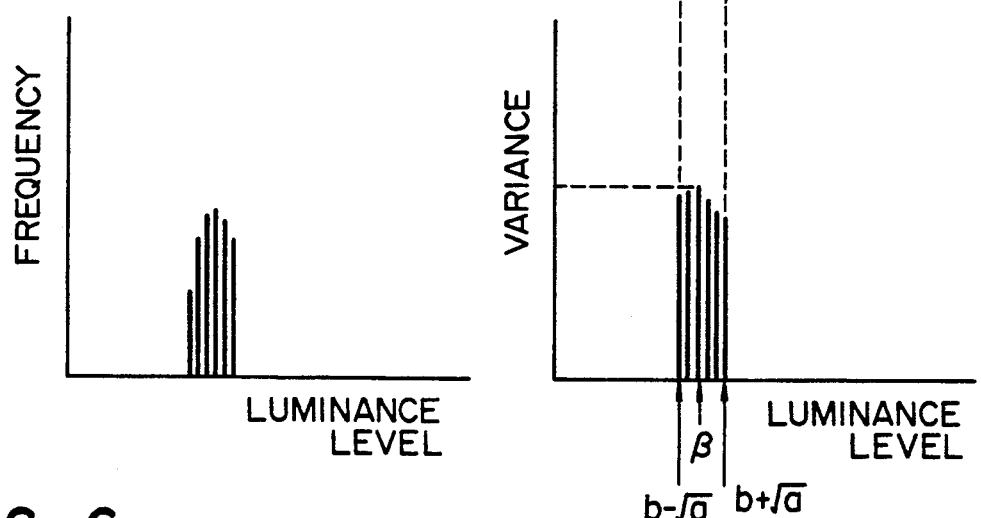
FIG. 5 contains graphs illustrating examples of a luminance distribution and a luminance variance of pixels in a vehicle existence judging region in which no vehicle exists.
Figure 6:
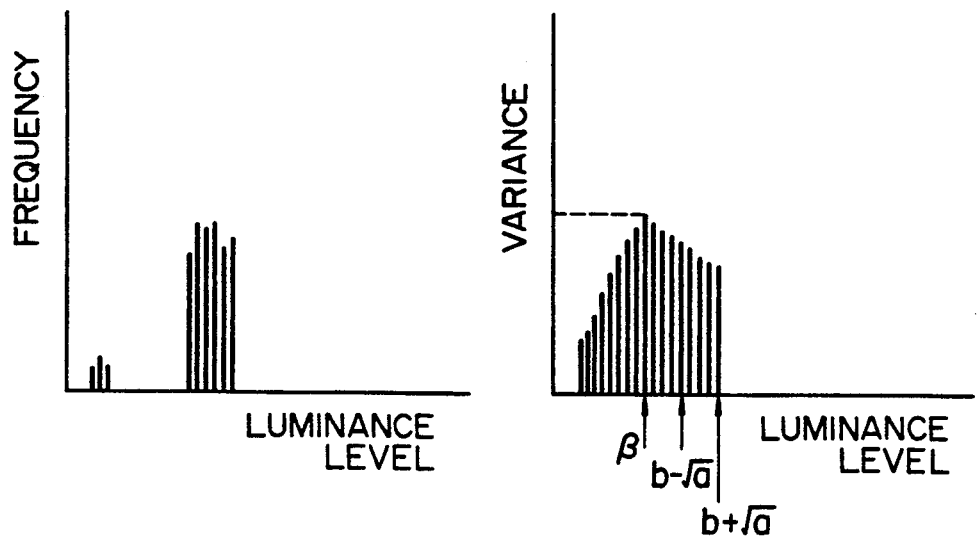
FIG. 6 contains graphs illustrating examples of a luminance distribution and a luminance variance of pixels in a vehicle existence judging region in which a vehicle exists, however, most of pixels therein have luminance close to that of a road surface.

FIG. 4 shows examples of a luminance distribution and a luminance variance of pixels, detected by the road surface luminance detector 15, in a region which includes only a road surface, FIG. 5 those in a vehicle existence judging region in which no vehicle exists, and FIG. 6 those of a case where a vehicle exists in a vehicle existence judging region. However, most of the pixels in the region have a luminance close to that of a road surface.

As shown in FIG. 5, when no vehicle exists in the vehicle judgment region, the luminance level $\beta$ at which the variance takes a maximum value is expressed by:

$$b-\sqrt{a} \leq \beta \leq b+\sqrt{a}$$

However, although a vehicle exists in a vehicle judgement region, if most of the pixels in the region have a luminance close to that of a road surface, the binary-conversion processing can hardly detect the characteristic of the vehicle due to lack of pixels having luminance out of the threshold values. However, by calculating the variance, a change can be seen in the luminance level $\beta$ at which the variance takes a maximum value by virtue of a small number of pixels having luminance out of the threshold values. If the small number of pixels have a luminance lower that the lower threshold level, $\beta < b-\sqrt{a}$ is satisfied, whereas, if they have a luminance higher than the upper threshold level, $b+\sqrt{a} < \beta$ is satisfied.

According to the present embodiment as described above, even for a case where "Vehicle Absent" has been judged from the result of the operation performed by the binary converting circuit 16 in spite of the existence of a vehicle parked in a parking space due to the majority of pixels in the vehicle existence judging region set by the vehicle existence judging region setting unit 14 having a luminance close to that of a road surface, a detection of the vehicle can be achieved by a luminance level at which the variance of luminance of the pixels in the vehicle existence judging region, calculated by the variance calculator 17, takes a maximum value.

Incidentally, although in the above embodiment, the region 23 for detecting a road surface luminance is provided only at a single location in the road surface luminance detector 15 as shown in FIG. 2, if such a region may be provided at a plurality of locations, the threshold values for binary conversion can be determined by mean values of maximum variance a and luminance levels b at the respective regions, thereby further improving the accuracy of the vehicle detection.

As is apparent from the description of the embodiment, the present invention produces the following effects:

(1) The variance of luminance of pixels within a vehicle existence judging region set in a parking space is calculated, and a luminance level at which the variation takes the maximum value is observed, thereby making it possible to detect a vehicle which has not been detected only by the binary-conversion processing due to a failure in revealing the characteristic of the vehicle.

(2) The variance processing, performed in addition to the binary-conversion processing, results in making a double check for the judgment on the existence of a vehicle, which leads to an improvement in the vehicle detection accuracy compared with the judgment made only by the binary-conversion processing.

I claim:

1. A vehicle detecting apparatus comprising:

a multiple-value image memory for storing an image signal representing a parking lot;

vehicle existence judging region setting means for setting a region along a border of a parking space in which the presence or the absence of a vehicle is to be detected;

vehicle existence judgement condition setting means for setting judgement conditions for judging the presence or the absence of a vehicle within the parking space;

road surface luminance detecting means for detecting a luminance level of a road surface;

binary converting circuit means for converting luminance information stored in said multiple-value image memory to a digital "1" or "0" based on a luminance level detected by said road surface luminance detecting means; and variance calculating means for calculating a variance luminance level in the region set by said vehicle existence judging region setting means, wherein a number of digital "1's∞ within said vehicle existence judging region outputted from said binary converting circuit means is counted and compared with the vehicle existence judgement condition, and it is judged that a vehicle is parked in a parking space when the counted number of digital "1's" satisfies the vehicle existence judgement condition, while a further judgment on a parked vehicle is made on the basis of a luminance level at which a variance of the luminance level of pixels in the vehicle existence judging region takes a maximum value when the counted number of digital "1's" does not satisfy the condition.

2. A vehicle detecting method for detecting a parked vehicle in a parking lot having at least one parking space by employing an image signal, said method comprising the steps of:

defining first pixels representing a road region and second pixels representing a vehicle existence judging region in said image signal;

detecting a luminance level of said first pixel;

obtaining a reference range by calculating a variance of said luminance level of said first pixels;

detecting a luminance level of said second pixels;

calculating a resultant variance of said luminance level of said second pixels; and recognizing a presence of said parked vehicle when said resultant variance lies out of said reference range.

* * * * *